(12) United States Patent
Nomura

(10) Patent No.: US 8,343,393 B2
(45) Date of Patent: Jan. 1, 2013

(54) MOLDING METHOD AND APPARATUS FOR AN OPTICAL ELEMENT

(75) Inventor: Takeshi Nomura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 122 days.

(21) Appl. No.: 12/500,182

(22) Filed: Jul. 9, 2009

(65) Prior Publication Data
US 2010/0019402 A1 Jan. 28, 2010

(30) Foreign Application Priority Data

Jul. 23, 2008 (JP) ................................ 2008-189282

(51) Int. Cl.
*B29D 11/00* (2006.01)
(52) U.S. Cl. ............... 264/2.2; 65/102; 65/286; 65/305; 264/2.7; 425/352; 425/407; 425/808
(58) Field of Classification Search ............... 264/2.2, 264/2.3, 2.5, 320, 322, 325, 2.7, 40.6, 2.4; 425/352, 355, 407, 808, 143; 65/29.1, 102, 65/286, 305
See application file for complete search history.

(56) References Cited

U.S. PATENT DOCUMENTS
5,976,425 A * 11/1999 Nomura et al. ............. 264/2.2

FOREIGN PATENT DOCUMENTS
JP 63-140035 U 9/1988
JP 11-157854 A 6/1999

OTHER PUBLICATIONS

Office Action in Chinese Application No. 200910165152.6 (Jun. 17, 2011).
Office Action in Taiwanese Application No. 098124564 (Jun. 21, 2012).
Office Action in Japanese Application No. 2008-189282 (Jul. 2012).

* cited by examiner

*Primary Examiner* — Mathieu D. Vargot
(74) *Attorney, Agent, or Firm* — Fitzpatrick, Cella, Harper & Scinto

(57) ABSTRACT

In a molding apparatus in which upper and lower dies are held in a bearing, there are provided pipes for introducing $N_2$ gas used for controlling temperatures of balls of the bearing, whereby difference in temperature between the guide member and the upper and lower dies is controlled. With this structure, it is possible to prevent generation of an excessive compressive force between the upper die and the lower die and the bearing, to thereby prevent breakage of the dies. Further, it is also possible to prevent formation of gaps between the upper die and the lower die and the bearing, to thereby mold an optical element excellent in accuracy of an optical axis.

4 Claims, 3 Drawing Sheets

MOLDING METHOD AND APPARATUS FOR AN OPTICAL ELEMENT

BACKGROUND OF THE INVENTION

1. Field of the Invention

The present invention relates to a molding method for an optical element and an optical element molding apparatus, in which an optical element is molded by pressing a heated glass material between a pair of dies.

2. Description of the Related Art

Conventionally, as a method of providing an optical element such as a lens by pressing a glass material, there has been generally adopted molding with use of a set of dies constituted by a pair of upper and lower dies and a guide member for holding the upper and lower dies in a sliding manner. In the case of a molding apparatus in which the set of dies constituted by the pair of upper and lower dies and the guide member for holding the upper and lower dies in a sliding manner are used, the guide member has a ring-like shape, and the upper and lower dies are slidably incorporated in a hole of a central portion formed in the guide member. In this case, when a lens is molded, it is necessary to perform molding while preventing relative displacement and inclination between an optical axis of an optical functional surface on one side and an optical axis of an optical functional surface on the other side. For that purpose, not only the upper and lower dies and the guide member has been finished with high accuracy, but also incorporating accuracy between the guide member and the upper and lower dies has been enhanced.

Further, in order to enhance incorporating accuracy, there has been made an attempt to obtain an optical element with excellent in optical axis accuracy by interposing a bearing between the guide member and the upper and lower dies so as to eliminate gaps between the dies and the guide member, which are formed at the time of moving the dies.

Japanese Utility Model Application Laid-Open No. S63-140035 discloses a structure in which the upper and lower die members are guided by the cylindrical member through the intermediary of the ball bearing. Further, there is also disclosed a configuration of setting the coefficient of thermal expansion of the ball bearing to be larger than the coefficient of thermal expansion of the upper and lower die members. With this, under low temperature, the gaps between the upper and lower dies and the ball bearing become larger, thereby facilitating assembly of the dies. Further, under the temperature of press-molding, the gaps between the upper and lower die members and the ball bearing become smaller, thereby enabling manufacture of an optical element of high accuracy, which involves less axial displacement.

However, in recent years, in the field of molding of an optical element with use of glass molding technology, further enhancement in accuracy has been demanded. Simultaneously, further cost reduction has been demanded.

However, in the case of Japanese Utility Model Application Laid-Open No. S63-140035, where the bearing is brought into point-contact with the upper and lower dies and the guide member, it is difficult to achieve the temperate follow-up of the bearing with respect to change in temperature of the upper and lower dies and the guide member. Therefore, there has been a problem in that the temperature of the bearing at the time of heating and cooling and the temperatures of the guide member and the upper and lower dies are liable to be different from each other.

That is, in the case of heating the upper and lower dies, the heating of the bearing is delayed with respect to the heating of the upper and lower dies. Therefore, the temperature of the bearing at the time of heating is lower than the temperatures of the upper and lower dies, and hence the gaps are formed between the upper and lower dies and the guide member. In contrast, cooling of the bearing is delayed at the time of cooling of the upper and lower dies, and the temperature of the bearing is increased in the middle of the cooling. Thus, relative dimensional changes are increased, whereby the gaps with respect to the upper and lower dies and the guide member become smaller so that an excessive compressive force is liable to be generated. Further, in the case of increasing the heating and cooling speeds, the tendency becomes more remarkable.

Further, even when the gaps between the upper and lower dies and the guide member are set in advance to be eliminated at the time of press-molding, the gaps become larger according to the progress of cooling, and hence gaps are formed in the vicinity of a glass transition point. In the vicinity of a glass transition point, the glass is deformable, and hence axial displacement occurs owing to pressure at the time of cooling.

SUMMARY OF THE INVENTION

It is an object of the present invention to provide a molding method for an optical element and an optical element molding apparatus in which an optical element significantly excellent in accuracy of an optical axis can be manufactured without involving a risk of breakage of dies while enabling reduction in tact time.

In order to achieve the above-mentioned object, an optical element molding apparatus according to the present invention includes: an upper die member (16) on which a first molding surface is formed; a lower die member (17) on which a second molding surface is formed; a guide member (4) for holding the upper die member and the lower die member through the intermediary of multiple rolling bodies (6 and 7), heating units (12, 13, and 14) for heating the upper die member, the lower die member, and the guide member, respectively; and a cooling unit (11) for cooling the upper die member, the lower die member, and the guide member, wherein: the first molding surface and the second molding surface are arranged while facing each other; the upper die member and the lower die member are movable in the guide member in a direction in which the first molding surface and the second molding surface are brought close to and separated from each other; and the multiple rolling bodies are heated or cooled so that difference in temperature between the upper die member, the lower die member and the guide member, and the multiple rolling bodies is controlled.

The present invention provides a molding method for an optical element, in which an optical element is press-molded using an optical element molding apparatus including an upper die member, a lower die member, and a guide member. The molding method for an optical element includes: an arranging step of arranging an optical material on the lower die member; a heat-softening step of heat-softening the optical material; a molding step of transferring a shape of the optical element, using a first molding surface of the upper die member and a second molding surface of the lower die member, which are brought close to each other in the guide member, to the optical material thus heat-softened; and a cooling step of cooling the upper die member, the lower die member, and the guide member. The upper die member, the lower die member, and the guide member are held through the intermediary of multiple rolling bodies, the multiple rolling bodies are heated or cooled in the cooling step, so that difference in temperature between the upper die member, the lower die member, and the guide member, and the multiple rolling bodies is controlled.

Further features of the present invention will become apparent from the following description of exemplary embodiments with reference to the attached drawings.

DESCRIPTION OF THE EMBODIMENTS

Embodiment 1

Figure 1:
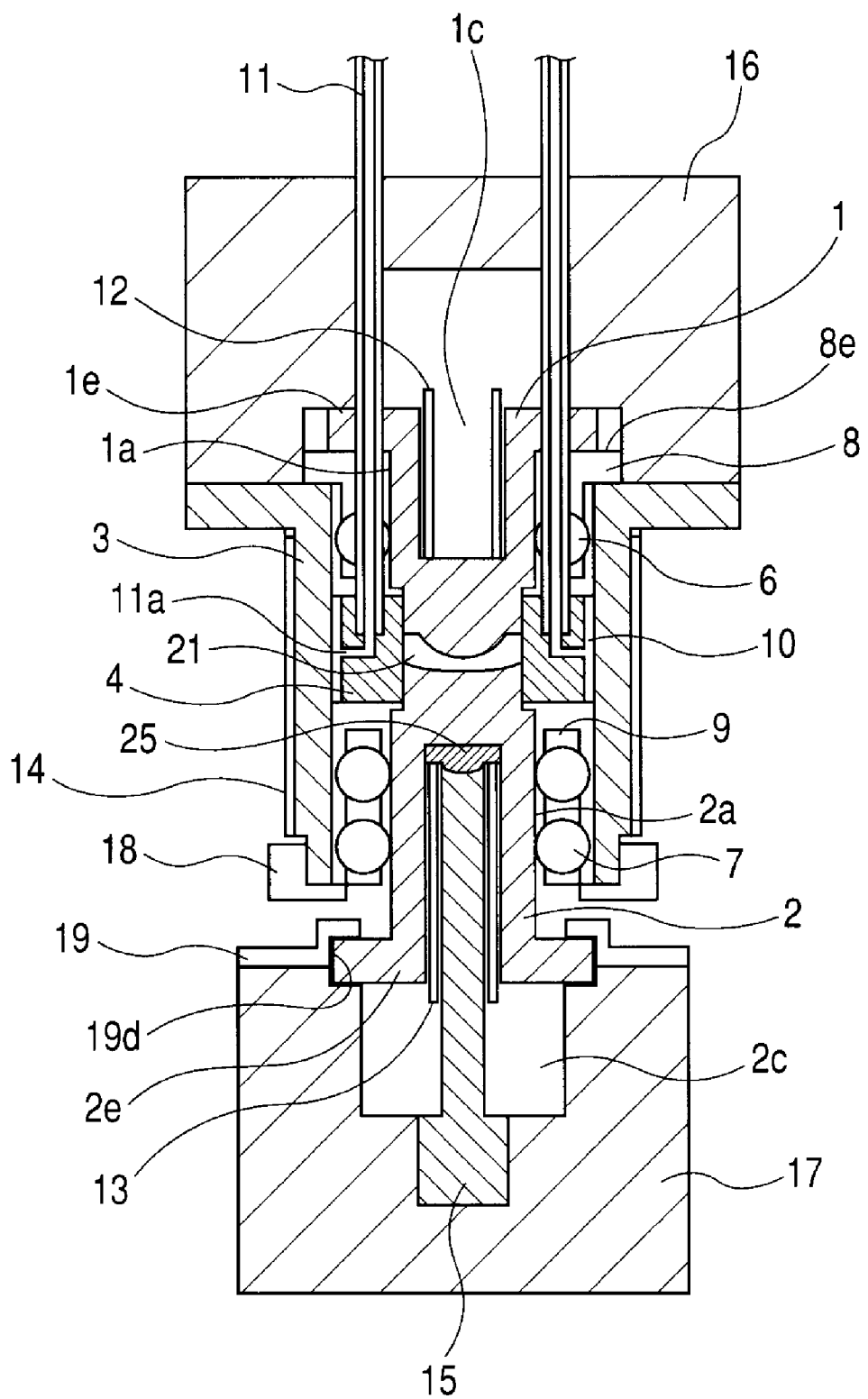
FIG. 1 is a schematic sectional view illustrating a state at a time when an optical element molding apparatus according to Embodiment 1 of the present invention performs pressing.
Figure 2:
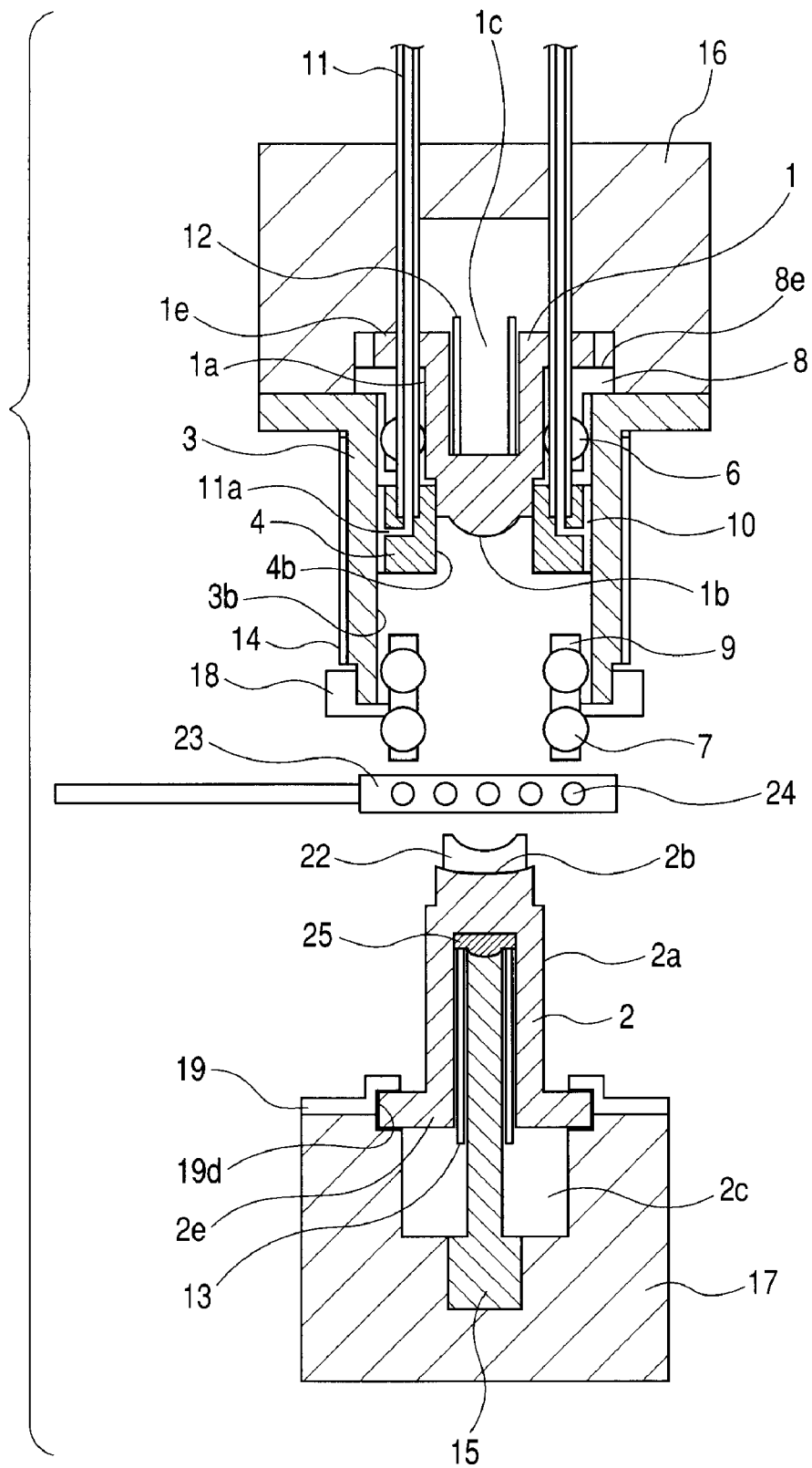
FIG. 2 is a schematic sectional view illustrating a state at a time when the optical element molding apparatus according to Embodiment 1 of the present invention performs heating.

An optical element molding apparatus according to Embodiment 1 of the present invention is described with reference to FIGS. 1 and 2. FIG. 1 illustrates a state in which upper and lower dies are closed after a pressing operation, and FIG. 2 illustrates a state in which the upper and lower dies are opened and the upper and lower dies prior to pressing and a glass material (material) are heated.

An upper die member 1 and a lower die member 2 constituting the upper and lower dies have cylindrical surfaces 1a and 2a, respectively. A guide member 3 supports a ring-shaped side die member 4. On a lower portion of the upper die member 1, there is formed a molding surface 1b for transferring a shape of an optical surface of an optical element to the glass material. Similarly, on an upper portion of the lower die member 2, there is formed a molding surface 2b. Further, on the outer peripheral surface of the molding surface 1b of the upper die member 1, there is formed a flat portion for molding a flat shape of the optical element.

The guide member 3 has a cylindrical shape. At the time of molding, the respective cylindrical surfaces 1a and 2a of the upper die member 1 and the lower die member 2 are inserted into a central hole thereof, and the guide member 3 movably holds the cylindrical surfaces 1a and 2a in the guide member 3 in a direction in which the molding surfaces 1b and 2b are brought close to and separated from each other.

The cylindrical surfaces 1a and 2a of the upper die member 1 and the lower die member 2 are held on an inner peripheral surface 3b of the guide member 3 (in guide member) through the intermediary of a bearing with high accuracy and thermal resistance, which is constituted by balls 6 and 7 as multiple rolling bodies and retainers 8 and 9. When necessary, dimensions of the cylindrical surfaces 1a and 2a of the upper die member 1 and the lower die member 2, the inner peripheral surface 3b of the guide member 3 and the balls 6 and 7 are adjusted so that preload is set to be applied to the balls 6 and 7 at the time of assembly. Then, an enclosed space is formed in a state in which the respective axial centers of the upper die member 1 and the lower die member 2 are caused to correspond with each other. Molding is performed in this manner.

On the inner periphery of the ring-shaped side die member 4, there is formed a molding surface 4b for transferring an outer peripheral shape of the optical element. The outer peripheral surface of the side die member 4 is engaged with and held on the inner peripheral surface 3b of the guide member 3, and grooves 10 are formed at a few points on the circumference while extending through the ring in a direction of the center axis line thereof.

The side die member 4 is connected to pipes 11, and is set by the pipes 11 at a predetermined position on the inner peripheral surface 3b of the guide member 3. The guide member 3 is fixed to an upper-die holding member 16 while sandwiching therebetween a flange portion 8e of the retainer 8 of the upper die portion and a flange portion 1e of the upper die member 1. The upper-die holding member 16 is fixed to a top plate of an element (not shown).

A flange portion 2e of the lower die member 2 is held on a lower-die holding member 17 by a presser 19. The lower-die holding member 17 is fixed to a pressing shaft (not shown), and further, the pressing shaft is connected to a driving source (not shown). In order to mold an optical element 21 illustrated in FIG. 1, the lower die member 2 having the molding surface 2b on which a glass material 22 illustrated in FIG. 2 is placed, can be advanced and retracted in a pressing shaft direction.

Between the flange portion 2e of the lower die member 2 and an inner peripheral surface 19d of the presser 19, there are formed gaps in a radial direction and a thickness direction. The lower die member 2 is movable within the range of the gaps.

A hollow portion 1c is formed on the side opposite to the molding surface 1b of the upper die member 1. A heater 12 is provided on the wall surface of the hollow portion 1c while held in close contact therewith, and is heated to a desired temperature by a thermocouple (not shown) plugged into the upper die member 1.

A hollow portion 2c is formed on the side opposite to the molding surface 2b of the lower die member 2. A heater 13 is provided on the wall surface of the hollow portion 2c while held in close contact therewith, and is heated to a desired temperature by a thermocouple (not shown) plugged into the lower die member 2.

A point pushing member 25 is provided at a bottom of the hollow portion 2c of the lower die member 2. Through the intermediary of a push shaft 15 provided to the lower-die holding member 17, pressure at the time of pressing is applied to the center of the lower die member 2.

A heater 14 is provided on an outer peripheral surface of the guide member 3 while an inner peripheral surface of the heater 14 is held in close contact therewith. The heater 14 is controlled to a desired temperature by a thermocouple (not shown) plugged into the guide member 3.

A stopper 18 is provided at the lower end portion of the guide member 3. As illustrated in FIG. 2, in order that the balls 7 do not fall even when the dies are opened so that the lower die member 2 is separated from the guide member 3, the retainer 9 is hooked at a predetermined position.

A heater block 23 incorporates a heater 24 so as to be controlled to a desired temperature by a thermocouple (not shown) plugged into the heater block 23, and are brought close to the retainer 9 and the glass material 22 prior to molding by a driving source (not shown).

To the hollow portions 1c and 2c of the upper die member 1 and the lower die member 2, there are provided $N_2$ gas inlet pipes (not shown), and cooling after molding is performed while controlling $N_2$ gas flow rates. Also in the guide member 3, there are provided $N_2$ gas inlet pipes (not shown) for spraying $N_2$ gas on the outer peripheral portion, and cooling is performed while controlling $N_2$ gas flow rates.

In the side die member 4, there are provided holes 11a through which the grooves 10 in the outer peripheral side surface portion are communicated with the pipes 11 constituting a temperature control unit, and the side die member 4 is cooled by cooled $N_2$ gas introduced from the pipes 11. In addition, by the $N_2$ gas flowing into the retainers 8 and 9 from the pipes 11, temperature control is performed through cooling of the balls 6 and 7.

Note that, when $N_2$ gas to be introduced into the pipes 11 is heated in advance, the balls 6 and 7 can be also heated in molding.

Next, there is sequentially described a molding method for an optical element, in which the optical element molding apparatus illustrated in FIGS. 1 and 2 is used. In order to prevent oxidization of dies and an apparatus, molding of the optical element is performed in $N_2$ gas atmosphere.

First, as illustrated in FIG. 2, the lower die member 2 is separated from the guide member 3 by the operation of the pressing shaft (not shown). In this state, the upper die member 1, the lower die member 2, and the guide member 3 are respectively heated by the heaters 12, 13, and 14 so that predetermined temperatures are maintained.

Next, with use of a hand (not shown), the glass material 22 arranged with high accuracy at the center of the molding surface 2b of the lower die member 2. After that, the temperatures of the upper die member 1, the lower die member 2, and the guide member 3 are controlled by the heaters 12, 13, and 14 so as to be raised to pressing temperatures and maintained thereat.

In this case, the heater block 23 controlled to temperatures at the time of pressing the upper die member 1 and the lower die member 2 or higher (+200° C., for example) is moved approximately above the glass material 22 by a driving source (not shown), whereby the glass material 22 as a material of the optical element is heat-softened. The heater block 23 is positioned approximately below the retainer 9 of the bearing for the lower die portion, and simultaneously, the retainer 9 is heated and the balls 7 supported by the retainer 9 are also heated. When the retainer 9 is difficult to heat, a mechanism for raising the heater block 23 may be provided so as to bring the heater block 23 close to the retainer 9.

The retainer 8 for the upper die portion is sandwiched, at the flange portion 8e, between the flange portion 1e of the upper die member 1 and the guide member 3. By heating the upper die member 1 and the guide member 3, the retainer 8 held in surface contact therewith is also heated.

The side die member 4 is also heated by receiving heat from the upper die member 1 and the guide member 3.

Then, at the time of heating, difference in temperature between the upper die member 1, the lower die member 2 and the guide member 3, and the balls 6 and 7 is controlled so that preload applied to the balls 6 and 7, which is set at the time of assembly, falls within a preset range.

Note that, when heating of the bearing is not performed, temperatures of the balls are raised later than those of the dies. Thus, there is a tendency that the preload is decreased, and gaps are formed in some cases.

In contrast, when the temperatures of the balls are excessively raised, the preload is increased so as to exceed the break strength of the balls and cause breakage in some cases. Therefore, it is necessary to appropriately control the temperatures. Actually, while the heating temperatures of the dies and the balls are determined in consideration of a coefficient of thermal expansion, a dimension, and a temperature of a material to be used, the temperatures of the balls may be set to be constantly close to those of the dies, and the difference in thermal expansion rate of the material may be absorbed by imparting a predetermined amount of preload, whereby formation of gaps is prevented at the time of heating.

With this, when there are obtained temperatures at which the dies and the glass material 22 can be subjected to pressing, the heater block 23 is retracted from above the glass material 22 by the driving source (not shown).

Then, the lower die member 2 is raised by the driving source (not shown). The lower die member 2 is raised into the inner peripheral surface 3b of the guide member 3 while being guided by the balls 7 of the retainer 9, and the glass material 22 is pressed by being sandwiched between the respective molding surface 1b and 2b of the upper die member 1 and the lower die member 2. In this manner, a shape of the optical element is transferred thereon.

In this case, as described above, the upper die member 1 and the lower die member 2 are held by the guide member 3 through the intermediary of the balls 6 and 7 without involving gaps. Further, excessive compressive stress leading to breakage of the balls is not generated.

When press molding is completed, a pressing force is temporarily cancelled or switched into a lower pressure mode. Then, cooling is started. As described above, the upper die member 1, the lower die member 2, and the guide member 3 are cooled by $N_2$ gas supplied through the $N_2$ gas inlet pipes (not shown).

$N_2$ gas is supplied from the pipes 11 so as to cool the side die member 4, and the $N_2$ gas blows out from the holes 11a communicated with the outer peripheral side surface of the side die member 4 after flowing through the grooves 10, whereby the retainers 8 and 9 and the balls 6 and 7 are cooled.

In this case, flow rates of the $N_2$ gas supplied to the upper die member 1, the lower die member 2, the guide member 3, and the pipes 11 are set in advance to be individually controllable, for example, with use of mass flow controllers.

Then, at the time of cooling, difference in temperature between the upper die member 1, the lower die member 2 and the guide member 3, and the balls 6 and 7 is controlled so that preload applied to the balls 6 and 7 falls within a preset range.

Note that, when cooling of the bearing is not performed, temperatures of the balls are lowered later than those of the dies. Thus, in contrast, there is a tendency that the preload is increased so as to exceed break strength of the balls and cause breakage in some cases.

In contrast, when temperatures of the balls are excessively lowered, the preload is decreased, and gaps are formed in some cases. Therefore, it is necessary to appropriately control the temperatures.

While the cooling temperatures of the dies and the balls are determined in consideration of a coefficient of thermal expansion, a dimension and a temperature of a material to be used, difference in thermal expansion rate of the material may be absorbed by imparting a predetermined amount of preload, and generation of excessive compressive stress may be prevented by cooling the balls and the dies so that temperatures thereof are constantly close to each other.

When cooling to a predetermined temperature is performed as described above, in order to prevent sink marks of the optical element 21 as a molded product caused by its shrinkage and separation from the molding surfaces 1b and 2b of the upper die member 1 and the lower die member 2, pressure is re-applied to the lower die member 2 by the driving source (not shown).

At a point in time when a predetermined temperature equal to or lower than a glass transition point is achieved as a result of additional cooling, pressure applied by the driving source (not shown) to the lower die member 2 is cancelled. At a point in time when a predetermined temperature is achieved as a result of still additional cooling performed when necessary, the lower die member 2 is lowered by the driving source (not shown).

In this case, at a point in time when the lower die member 2 lowered while being guided by the balls 7 of the retainer 9 is completely separated from the guide member 3, the retainer 9 is supported by the stopper 18 so as not to fall. Then, with use of the hand (not shown), the optical element 21 as a molded product on the molding surface 2b of the lower die member 2 is taken out, and molding is completed.

Also in the cooling, as described above, the upper die member 1 and the lower die member 2 are supported by the guide member 3 through the intermediary of the balls 6 and 7, and excessive compressive stress leading to breakage of the balls is not generated. By a series of the above-mentioned operations, molding is repeatedly performed.

Example 1

With use of the optical element molding apparatus illustrated in FIGS. 1 and 2, a lens used in a camera was molded. The procedure is described in detail.

A biaspherical concave meniscus lens was molded with use of a glass material having a transition point of 510° C. The biaspherical concave meniscus lens had a concave aspherical surface (approximate radius R: 5.5 mm) formed on the upper surface side thereof, in which an outer region to a region of 9.5 mm diameter exhibited a flat surface, and had a convex aspherical surface (approximate radius R: 40 mm) formed on the lower surface side and having Φ12.5 mm outer diameter and 1.6 mm center thickness.

Diameter of the cylindrical portions of the upper die member 1 and the lower die member 2 was set to Φ15.006 mm, diameter of the balls 6 and 7 was set to Φ6.35 mm, and materials thereof including that of the guide member 3 was superhard and had a coefficient of thermal expansion of $5.0 \times 10^{-6}$/kelvins (K).

Diameter of the inner peripheral surface 3b of the guide member 3 was set to Φ27.7 mm, and preload was set to be applied to the balls 6 and 7 correspondingly to an amount by which 0.006 mm dimension was compressed when the dies were engaged at room temperature.

First, the upper die member 1, the lower die member 2, and the guide member 3 are heated so that temperatures thereof were maintained at 460° C. (equivalent to $10^{17.6}$ poises indicating viscosity of glass).

In this state, after the glass material 22 was put therein, the heater block 23 heated to 900° C. was moved to a position 2 mm above the glass material 22 and 1 mm below the retainer 9, and the glass material 22 and the retainer 9 were heated.

Simultaneously, the upper die member 1, the lower die member 2, and the guide member 3 were also heated so as to reach a temperature of 570° C. (equivalent to $10^{9.1}$ poises) at the time of pressing in one minute.

Then, at a point in time when the temperatures of the upper die member 1, the lower die member 2, and the guide member 3 reached 570° C. (equivalent to $10^{9.1}$ poises) and the temperature of the glass material 22 reached 580° C. (equivalent to $10^{8.6}$ poises), the heater block 23 was retracted, and immediately thereafter, the lower die member 2 was raised and pressing was started. A pressing force at this time was 2,900 Newtons (N).

The temperatures of the balls 6 and 7 were raised to 500° C., and the preload applied to the balls 6 and 7 was still left correspondingly to an amount by which 0.002 mm dimension was compressed. Thus, gaps were not formed between the balls and the dies.

Further, pressing was continued at a fixed temperature, and the preload gradually approached an initial value.

Then, at a point in time when the glass material 22 was pressed to a fixed thickness, the pressure applied to the lower die member 2 was lowered to 490 Newtons (N), and a substantial pressing operation was completed. After that, $N_2$ gas was started to be sprayed, that is, cooling is started.

$N_2$ gas of 20 litters per minute was caused to flow toward each of the upper die member 1 and the lower die member 2, $N_2$ gas of 30 litters per minute toward the guide member 3, and $N_2$ gas of 10 litters per minute toward the pipes 11.

In this case, $N_2$ gas was caused to flow at fixed flow rates. However, in some cases, it is possible to control the flow rates to be varied so that difference in temperature between the members does not occur.

Then, at a point in time when the temperatures of the upper die member 1 and the lower die member 2 reached 550° C. (equivalent to $10^{10.3}$ poises), a force of 2,900 Newtons (N) was applied to the optical element 21 as a molded product by the lower die member 2. At this time, the temperature of the guide member 3 was 560° C., and the temperatures of the balls 6 and 7 were 530° C.

Thus, at this time, preload correspondingly to an amount by which 0.003 mm dimension was compressed was applied to the balls 6 and 7. As a result, gaps were not formed, or stress reaching break strength of the balls was not generated.

Cooling was continued in this state, and the pressure from the lower die member 2 was cancelled at a point in time when the temperatures of the upper die member 1 and the lower die member 2 reached 480° C. (equivalent to $10^{15.5}$ poises). At this time, the temperature of the guide member 3 was 500° C., and the temperatures of the balls 6 and 7 were 510° C.

Thus, at this time, preload correspondingly to an amount by which 0.005 mm dimension was compressed was applied to the balls 6 and 7. As a result, gaps were not formed, or stress reaching break strength of the balls was not generated.

After that, the upper die member 1 and the lower die member 2 were cooled until the temperatures thereof reached 460° C. (equivalent to $10^{17.6}$ poises). At this point in time, the lower die member 2 was lowered to open the dies so as to take out the optical element 21. At this time, the temperature of the guide member 3 was 480° C., and the temperatures of the balls 6 and 7 were 500° C.

Thus, at this time, preload correspondingly to an amount by which 0.006 mm dimension was compressed was applied to the balls 6 and 7. As a result, gaps were not formed, or stress reaching break strength of the balls was not generated.

Even after lens molding was performed 1,000 times by a series of the above-mentioned operations, the dies were not broken or damaged, and it was able to obtain a lens significantly excellent in accuracy of an optical axis, which involves displacement of 2 μm or smaller between the optical axes of the two surfaces of the lens.

Comparative Example 1

For comparison, a case is described where, in the molding, the heater block 23 and the retainer 9 were separated from each other by 50 mm so as to stop substantial heating of the retainer 9.

In this case, while the temperatures of the upper die member 1, the lower die member 2, and the guide member 3 were 570° C. at the time of starting pressing after heating, the temperature of the balls 7 was raised up to 410° C. As a result, preload applied to the balls 7 was eliminated, and hence 4 μm gaps were formed in contrast to Example 1.

Further, owing to deformation of the balls at the time of pressing and postural deterioration of the upper die member 1 and the lower die member 2 with respect to the guide member 3, the displacement between the optical axes of the two surfaces of the molded lens was deteriorated to 10 μm. The lens required significantly excellent in accuracy of an optical axis was not obtained.

In addition, a case is described where, in the cooling, supply of $N_2$ gas is stopped so as not to cool the balls 6 and 7.

In this case, the difference in temperature between the balls 6 and 7 and the other dies became largest when the lower die member 2 was lowered after the cooling. At this time, the temperatures of the upper die member 1 and the lower die member 2 were 460° C., the temperature of the guide member 3 was 460° C., and the temperatures of the balls 6 and 7 were 530° C.

Thus, at this time, preload correspondingly to an amount by which 0.01 mm dimension was compressed was applied to the balls 6 and 7. As a result, gaps were not formed.

However, the result of examinations on the dies subjected to molding 1,000 times showed that abrasions with respect to the balls 6 and 7 were caused on the cylindrical surface 2a of the lower die member 2, which led to a risk of deterioration in accuracy of the cylindrical surface 2a, that is, deterioration in accuracy of the optical axes.

Embodiment 2

Figure 3:
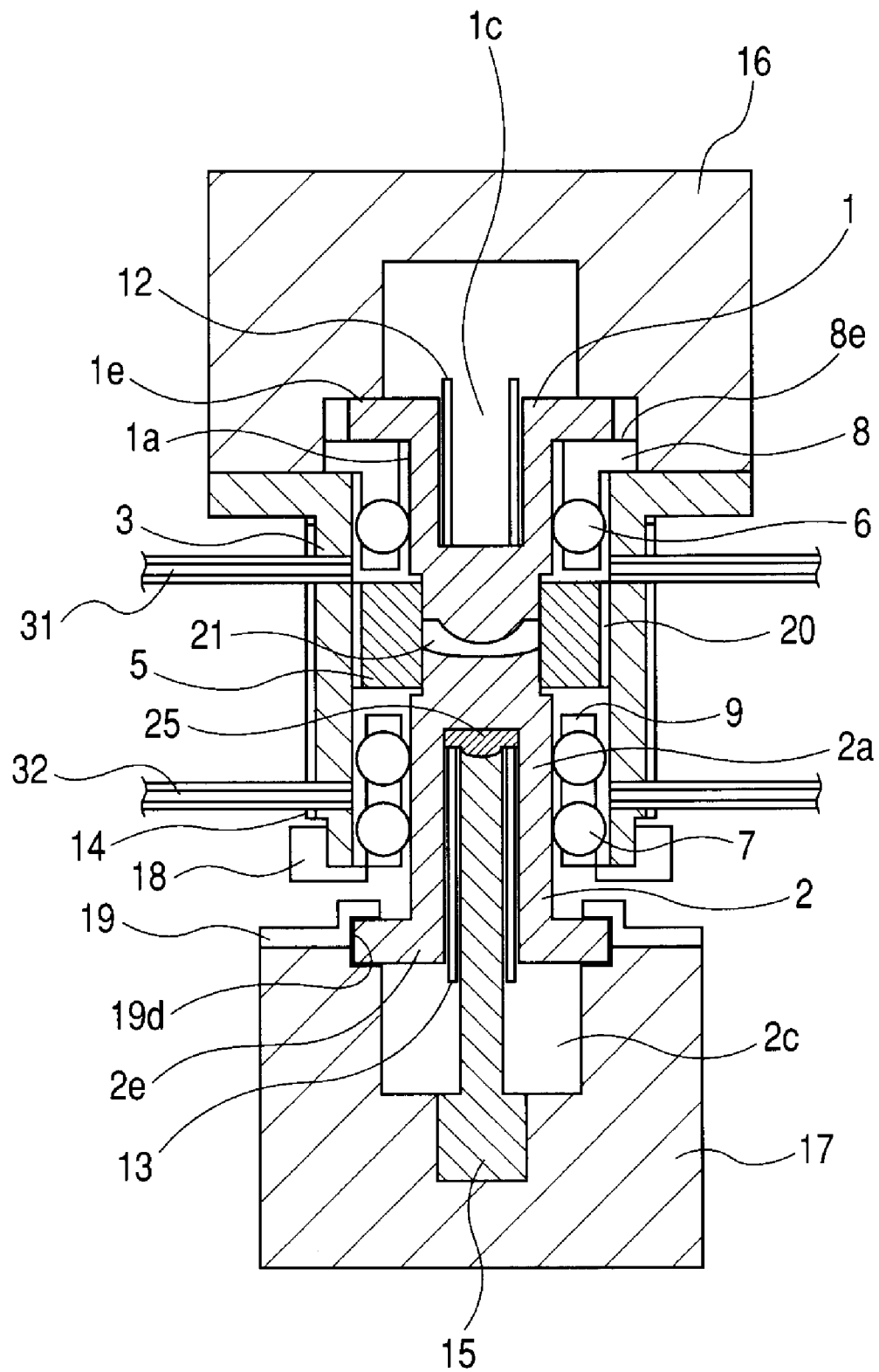
FIG. 3 is a schematic sectional view illustrating a state at a time when an optical element molding apparatus according to Embodiment 2 of the present invention performs pressing.

FIG. 3 illustrates an optical element molding apparatus according to Embodiment 2 of the present invention, in which a side die member 5 having only grooves 20 provided in the outer peripheral surface thereof is used in place of the side die member 4 in Embodiment 1.

Further, in place of the pipes 11, with use of pipes 31 and 32 constituting a temperature control unit, $N_2$ gas is directly sprayed from the side surface direction of the guide member 3 onto the upper and lower retainers 8 and 9 so as to cool the balls 6 and 7.

With this, it is possible to cool the balls 6 and 7 more efficiently, and to change the flow rates of $N_2$ gas to the upper and lower retainers 8 and 9, respectively. As a result, more strict control can be performed.

Further, the heater block 23 is not used at the time of heating, and heated $N_2$ gas is caused to flow through the pipes 31. As a result, the balls 6 and 7 can be directly heated.

Herein, while examples of heating methods for the balls 6 and 7 include the heater block 23 and the heated $N_2$ gas, this should not be construed restrictively. For example, the balls 6 and 7 may be directly heated with use of a heater provided to the retainer portion.

Further, the same applies to the cooling. The balls 6 and 7 may be cooled by a method of pressing a cooling block instead of using $N_2$ gas.

Note that, the set values of preload and the temperatures of the dies and the bearing are merely exemplified. Therefore, it is not necessary to set the temperatures of the dies to be equal to each other, and it is sufficient that optimum preload and temperatures are set based on dimensions, materials, structures thereof, and heating and cooling methods therefor.

That is, as the basis therefor, it is important to set dimensions so that gaps with respect to the bearing are not formed, material is not damaged or broken, in the case where squeezing occurs, by stress generated according to the squeezing. It is sufficient that the dimensions are set within the range as described above.

In addition, the following system may be structured in which the temperatures of the dies and balls are monitored, gaps and stress to be generated are sequentially calculated based on the monitored temperatures, and warning is issued when gaps and excessive stress are generated or expected to be generated.

As described above, in the present invention, the temperatures of the rolling bodies (bearing) are independently controlled, whereby it is possible to eliminate the difference in temperature between the dies and guide member and the bearing, which is caused by retard in temperature follow-up of the bearing.

Further, it is also possible to inhibit formation of the gaps between the dies and the bearing, and generation of an excessive compressive force. As a result, it is possible to prevent breakage of the dies, and to achieve excellent accuracy of an optical axis by maintaining the sliding gaps between the bearing and the dies to be eliminated.

Further, by heating or cooling the upper and lower dies, the bearing and the guide member, respectively, it is possible to control the gaps and preload of the bearing over the entire temperature range, in the whole step from the start of heating to the completion of cooling, in particular, from the start of pressing to the point in time when a temperature equal to or lower than a glass transition point is achieved at the time of cooling, in which glass can be deformed. As a result, it is possible to reduce axial displacement between the dies, thereby possible to mold an optical element of excellent accuracy.

Further, there can be achieved an effect increasing degree of freedom in selecting materials (coefficient of thermal expansion) of the upper and lower dies, the bearing, and the guide member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-189282, filed Jul. 23, 2008, which is hereby incorporated by reference in its entirety.

What is claimed is:

1. An optical element molding apparatus for press-molding a softened optical material, comprising:
    an upper die member on which a first molding surface is formed;
    a lower die member on which a second molding surface is formed;
    a guide member for holding the upper die member and the lower die member through the intermediary of multiple rolling bodies, with the first molding surface and the second molding surface facing each other, and with the upper die member and the lower die member being movable along the guide member in a direction in which the first molding surface and the second molding surface are brought close to and separated from each other;
    a heating unit configured to heat the upper die member, the lower die member, and the guide member; and
    a heater block configured to heat the optical material and the multiple rolling bodies in a state of the lower die member separated from the guide member,
    wherein the multiple rolling bodies are heated so that differences in temperature between the upper die member and the multiple rolling bodies, between the lower die member and the multiple rolling bodies, and between the guide member and the multiple rolling bodies are controlled while the softened optical material is press-molding in a state of the lower die member assembled with the guide member.

2. A molding method for an optical element, in which an optical element is press-molded with use of an optical element molding apparatus comprising an upper die member, a lower die member, and a guide member, the molding method for an optical element comprising:

an arranging step of arranging an optical material on the lower die member;

a heat-softening step of heat-softening the optical material in a state of the lower die member separated from the guide member;

a molding step of transferring a shape of the optical element with use of a first molding surface of the upper die member and a second molding surface of the lower die member in a state of the lower die member assembled with the guide member, which are brought close to each other along the guide member to the heat-softened optical material; and a cooling step of cooling the upper die member, the lower die member, and the guide member, wherein the upper die member, the lower die member, and the guide member are held through the intermediary of multiple rolling bodies, and the multiple rolling bodies are heated in the heat-softening step by a heater block, which controls a temperature of the multiple rolling bodies so that differences in temperature between the upper die member and the multiple rolling bodies, between the lower die member and the multiple rolling bodies, and between the guide member and the multiple rolling bodies are controlled in the molding step.

3. The optical element molding apparatus according to claim 1, further comprising a temperature control unit configured to heat or cool the multiple rolling bodies by gas in a state of the lower die member assembled with the guide member and to control a temperature of the multiple rolling bodies.

4. The method according to claim 2, wherein the multiple rolling bodies are cooled by gas in the cooling step so that differences in temperature between the upper die member and the multiple rolling bodies, between the lower die member and the multiple rolling bodies, and between the guide member and the multiple rolling bodies are controlled in the cooling step.

* * * * *